US007065509B2

(12) United States Patent
Arnold et al.

(10) Patent No.: US 7,065,509 B2
(45) Date of Patent: Jun. 20, 2006

(54) METHOD, SYSTEM AND COMPUTER PROGRAM PRODUCT FOR PROTECTION OF IDENTITY INFORMATION IN ELECTRONIC TRANSACTIONS USING ATTRIBUTE CERTIFICATES

(75) Inventors: Gordon K. Arnold, Cary, NC (US); David G. Kuehr-McLaren, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 416 days.

(21) Appl. No.: 10/434,883

(22) Filed: May 9, 2003

(65) Prior Publication Data

US 2004/0225614 A1    Nov. 11, 2004

(51) Int. Cl.
*G06Q 99/00* (2006.01)

(52) U.S. Cl. .................. 705/76; 705/67; 705/64; 705/75; 705/78; 713/155; 713/156; 713/159; 713/182; 726/4; 726/5

(58) Field of Classification Search ............ 705/64–79; 713/155–159, 182, 200–202; 726/4, 5
See application file for complete search history.

(56) References Cited

U.S. PATENT DOCUMENTS

| 5,699,431 A * | 12/1997 | Van Oorschot et al. ........ 380/30 |
| 5,745,574 A | 4/1998 | Muftic ........................ 380/23 |
| 5,987,440 A | 11/1999 | O'Neil et al. ................. 705/44 |
| 2003/0120611 A1* | 6/2003 | Yoshino et al. ............... 705/67 |
| 2004/0010698 A1* | 1/2004 | Rolfe ........................... 713/186 |
| 2004/0039911 A1* | 2/2004 | Oka et al. .................... 713/175 |

FOREIGN PATENT DOCUMENTS

| EP | 0605106 A1 | 7/1994 |
| JP | 2003-058049 | * 2/2003 |
| WO | WO 99/52242 | 10/1999 |
| WO | WO 99/66428 | 12/1999 |
| WO | WO 00/28452 | 5/2000 |
| WO | WO 00/29973 | 5/2000 |
| WO | WO 01/43344 A1 * | 6/2001 |

OTHER PUBLICATIONS

Swindells & Henderson, "Legal regulation of electronic commerce," Journal of Information Law & Technology, No. 3 (1998) [Inspec Abstract Only].

Gerhard & Rohm, "A secure electronic market for anonymous transferable emission permits," Proceedings of the 31st Hawaii Intl. Conference on System Sciences (Cat. No. 98TB100216), Pt. vol. 4, pp. 232-241, Los Alamitos, CA (1998) [Inspec Abstract Only].

* cited by examiner

*Primary Examiner*—James P. Trammell
*Assistant Examiner*—Jalatee Worjloh
(74) *Attorney, Agent, or Firm*—Synnestvedt & Lechner LLP

(57) ABSTRACT

Parties involved in a particular transaction in an E-marketplace each identify and submit to the E-marketplace relevant characteristics related to that transaction. The identification of the party is not revealed with this submission. To achieve this, an attribute certificate is created which contains attributes related to a buyer or seller's potential participation in a transaction. The attributes that are selected pertain to specifics of the transaction and not to the certificate holder. Each of the attributes are verified by a trusted authority (e.g., the E-marketplace acting as an intermediary for the transaction) so that when the attribute certificate is supplied to a party, the party is assured that the information it contains is accurate. In this manner, parties to a negotiation in a particular transaction are able to know immediately and with a high level of assurance that certain critical elements to the proposed transaction are met (or are capable of being met). This information is made available to all who wish to participate in the bidding/negotiating process (as opposed to being available only when specifically authorized by the certificate owner) but without the need to identify the certificate owner.

11 Claims, 3 Drawing Sheets

METHOD, SYSTEM AND COMPUTER PROGRAM PRODUCT FOR PROTECTION OF IDENTITY INFORMATION IN ELECTRONIC TRANSACTIONS USING ATTRIBUTE CERTIFICATES

BACKGROUND OF THE INVENTION

1. Field of the Invention

The present invention relates to computer-based on-line commerce in which sellers and buyers of goods or services are linked via an electronic marketplace where deals are negotiated and consummated.

2. Description of the Related Art

As networks of linked computers become an increasingly more prevalent concept in everyday life, on-line interactions between buyers and sellers have become commonplace. Transactions between a business and an individual consumer are referred to as business-to-consumer (B2C) transactions and transactions between businesses (e.g., the sale of goods from a wholesaler to a manufacturer who uses the purchased goods to eventually sell a product on the retail level) are referred to as business-to-business (B2B) transactions.

As a result of this increased use of networked computers to transact business, the concept of the electronic marketplace, referred to herein as the "E-marketplace," has emerged and become a standard form of conducting these business transactions. For a variety of reasons, the intermediary function provided by the E-marketplace is now an everyday part of transactional commerce.

On the consumer end, E-commerce sites such as E-Bay, half.com, Ubid.com, and AuctionPort.com provide an E-marketplace serving as a central location for negotiation of sales and/or auctions of products or services from a seller to a consumer (e.g., bidders). Likewise, B2B sellers, such as BizBuyer.com and FastParts.com, provide a similar intermediary service for business transactions between businesses.

Unlike a typical "brick-and-mortar" establishment where the buyer and seller will typically meet face-to-face and negotiate deals, and where the parties can gauge reactions by watching and listening, in an E-marketplace no such interaction occurs and, in fact, it may be desirable for the identity of the parties to the transaction to be concealed. For example, if a large company is involved in a transaction, a seller seeking to make a sale to a large corporation may attempt to charge a higher price simply because of the corporation's "deep pocket." Similarly, a large corporation may sell products at a reduced price to a favored business partner while not wishing to give the same favorable terms to a first-time or occasional purchaser. In either case, it may be desirable for one or both of the parties to remain anonymous. However, even when a pseudonym is used for a transaction, existing methods of concealing identities fall short. For example, a bidder on E-Bay can be tracked across an auction by his or her user ID (often a pseudonym), and the bidder must also disclose his or her email address to vendors, in order to inquire about or to purchase an item. This information (user ID, email address, etc.) is the bidder's "bid history". Once this information is revealed, a seller can use the bidder's bid history to make contact, e.g., by sending multiple, continual emails presenting offers of items the bidder has shown interest in from past bids.

Verification-of-identity issues are also of concern in an E-marketplace since, unlike a face-to-face transaction, an E-marketplace transaction is essentially "faceless." However, under current E-marketplace scenarios, the only viable options available in the prior art are total security, where everything communicated between the buyer and seller is closed to all others, or the use of "public-key encryption", which allows the verification of identity information to protect very limited, static, encrypted information (e.g., credit card numbers), but all other information is open to the public and linkable to the public-key holder. The "total security" option prevents public negotiation and other advantages offered by a multi-vendor marketplace. Since a primary benefit of an E-Marketplace is its open nature, which makes public negotiation available, security measures such as public-key certificates are typically employed in an E-marketplace environment.

As is well known, public key encryption systems involve the use of a publicly available public key in conjunction with a related private key available only to authorized persons or entities. Use of both keys is necessary to encrypt and decrypt the information.

Attribute certificates were developed to augment public-key certificates. An attribute certificate has the same structure as a public-key certificate and is, in fact, a type of public key certificate. In addition to containing the public-key of the certificate holder, however, it also contains information (attributes) of the holder, and does not contain identity information. Instead, it can be linked to the public key certificate of the holder. For example, attribute certificates have been used in the Health Care industry to identify the accreditation, certification(s) and role of a particular health care provider providing medical advice or information electronically. One of the benefits of using an attribute certificate is that unlike an identification certificate, which stays essentially the same all the time, attributes are dynamic and thus may change frequently (e.g., additional certifications may be obtained, or the health care provider may have different roles depending on a situation). Attribute certificates can be issued with a limited lifetime so that they expire automatically, eliminating the administrative burden of having to continually revoke and revise certificates each time there is a change in an attribute.

Applicant is unaware of any use of attribute certificates in connection with transactions in an E-marketplace or similar electronic transactional situation. Thus, a problem exists where customers and vendors may want a private relationship for a transaction, but wish to gain the advantage of the public negotiation offered by a multi-vender E-marketplace.

SUMMARY OF THE INVENTION

In accordance with the present invention, parties involved in a particular transaction in an E-marketplace each identify and submit to the E-marketplace relevant characteristics related to that transaction. The identification of the party is not revealed with this submission. To achieve this, an attribute certificate is created that contains attributes related to a buyer or seller's potential participation in a transaction. The attributes that are selected pertain to specifics of the transaction and not to the identification of the certificate holder. Such attributes include, but are not limited to, the volume of a product needed (e.g., 10,000 units per day for 2 years), the volume of product capable of being supplied (e.g., 100,000 units per month), credit information, payment history, delivery terms, bonding information, insurance information, ratings provided by third parties (e.g., the e-Marketplace, the Better Business Bureau, etc.), required licenses (e.g., retail license, toxic chemical license, etc.), state/federal certifications, industry certification, or international certifications.

Each of the attributes are verified by a trusted authority (e.g., the E-marketplace acting as an intermediary for the transaction) so that when the attribute certificate is supplied to a party, the party is assured that the information it contains is accurate. In this manner, parties to a negotiation in a particular transaction are able to know immediately and with a high level of assurance that certain critical elements to the proposed transaction are met (or are capable of being met). This information is made available to all who wish to participate in the bidding/negotiating process (as opposed to being available only when specifically authorized by the certificate owner) but without the need to identify the certificate owner. Using this arrangement, a party that has specific requirements with respect to a transaction can anonymously "weed out" sellers or buyers that do not meet their criteria. Since the nature of an attribute certificate is temporary, the attribute certificate can, if desired, pertain to a single transaction and not be utilized for (or linked to) other transactions involving the same seller or consumer.

DETAILED DESCRIPTION OF THE PREFERRED EMBODIMENTS

The present invention utilizes "attribute certificates" to provide transactional information related to the parties to a particular transaction (e.g., a buyer and/or seller) while allowing specific details that would otherwise identify the parties to the transaction to remain unidentified. As discussed above, attribute certificates are well-known and it is not the attribute certificate itself that is the subject of the present invention but rather a novel method of using attribute certificates in electronic transactions.

The following terms used herein are defined as follows.

"Identity information" means information and other data that identifies a prospective party to a transaction, and includes such information as the name, address, email address, telephone number of the potential participant;

"Transaction information" means information or data pertaining to a transaction with which a potential participant may be involved, and includes such information as quantities of a particular item needed, quantities of a particular item available for sale, credit information, delivery information, etc. Transaction information, by definition, excludes identity information.

Figure 1:
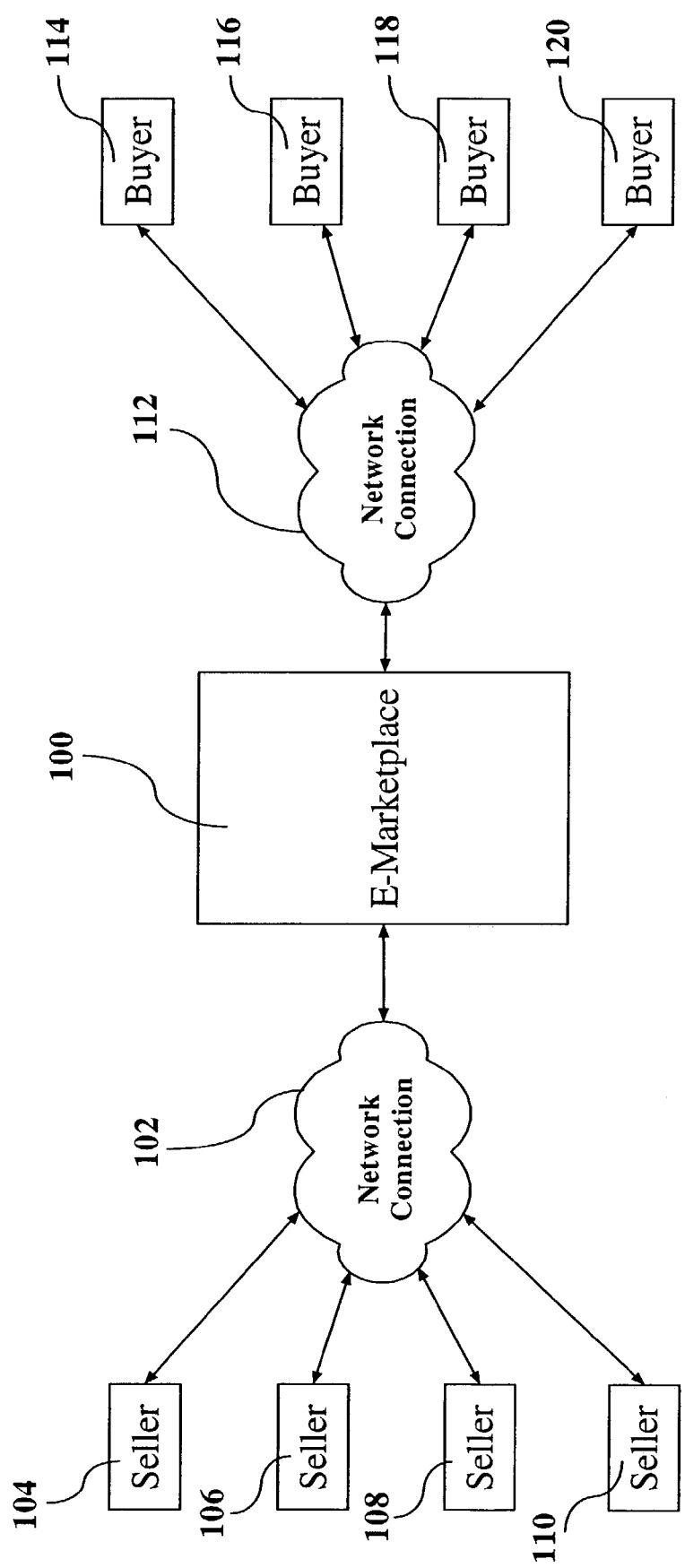
FIG. 1 illustrates a typical E-marketplace environment in which the present invention can be practiced.

FIG. 1 illustrates a typical E-marketplace environment in which the present invention can be practiced. An E-marketplace 100 is coupled to a plurality of sellers 104, 106, 108 and 110 via a network connection 102 (e.g., the Internet). Similarly, E-marketplace 100 is connected to a plurality of buyers 114, 116, 118, and 120 via a network connection 112. Typically, the E-marketplace 100 will comprise a server configured to receive communications from the network connections 102, 112, store information for viewing by parties connection to the network connections 102 and 112, and store other information pertaining to transactions which may occur in the E-marketplace. Sellers 104, 106, 108, and 110, and buyers 114, 116, 118, and 120, typically use PC workstations, networks, wireless devices, or other network communication devices for accessing the E-marketplace via the network connections 102 and 112.

In a typical electronic transaction using the environment illustrated in FIG. 1, a seller, e.g., seller 104, will connect to E-marketplace 100 via the network connection 102 and register with the E-marketplace. Seller 104 may identify itself by a pseudonym and typically will be required to also provide true name, address, e-mail address and other identity information for identification purposes.

Seller 104 will also provide an attribute certificate containing transaction information regarding a particular transaction (e.g., the specifications of a particular IC chip). This transaction information is used by potential purchasers to evaluate purchases, as well as by the E-marketplace to attract potential purchasers.

This transaction information may include quantities available for purchase, pricing information, delivery information, payment terms that will be accepted, and the like. Much of this transaction information may be important to only one particular transaction, but not to another. In accordance with the present invention, this specific transaction information pertaining only to attributes of the transaction is provided to the E-marketplace using an attribute certificate so that it is separable from the identification information and will be available to all interested in participating in the bidding/negotiating process with respect to that transaction. The attribute certificate submitted by the seller 104 describes transaction-related attributes related to the seller and the products involved in a particular transaction; it does not disclose the identity of the seller or other identity information unrelated to the transaction itself.

The same type of information can be provided to the E-marketplace by potential buyers. For example, buyer 114 can provide an attribute certificate to E-marketplace 100 via network connection 112. The attribute certificate from the buyer might include desired items to purchase, quantities for purchase, as well as credit history, financial information, and the like related to a particular transaction.

One concern with use of attribute certificates in the above-described manner is the possibility that unverified and inaccurate information might be provided with the attribute certificate in an attempt to "get a foot in the door" to a transaction when the owner of the attribute certificate cannot perform in a manner indicated by the attribute certificate. To assure that this does not occur, in a preferred embodiment, the E-marketplace 100 verifies all of the information provided in the attribute certificate before the attribute certificate and/or the information contained therein is provided to users of the E-marketplace. This allows the buyers and sellers to conduct their negotiations with the knowledge that the information they receive regarding potential participants to the negotiation is accurate and that time will not be wasted by the parties.

Once this information is confirmed and made available to the E-marketplace 100 in attribute-certificate format, the information will be available to the parties taking advantage of the E-marketplace 100, both buyers and sellers. The buyers and sellers can pull up a list of participants and "weed" through the information provided in the attribute certificates, looking for a transaction that meets their criteria.

Figure 2:
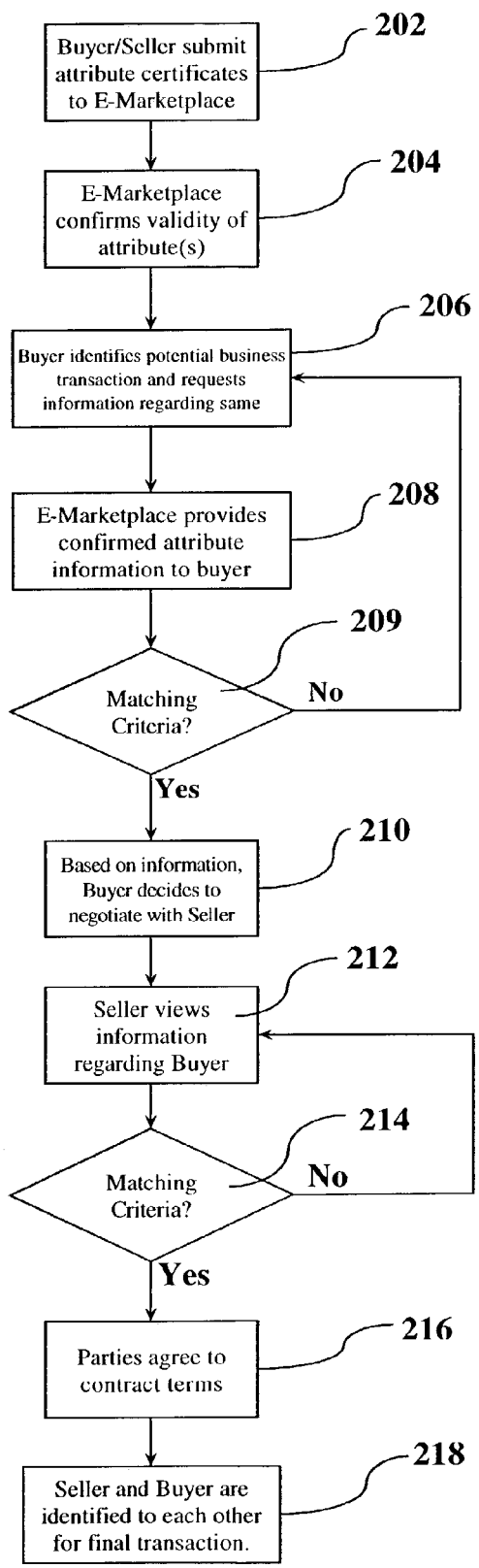
FIG. 2 is a flowchart illustrating an example of basic steps performed in accordance with the present invention.

FIG. 2 is a flowchart illustrating an example of the basic steps performed in accordance with the present invention. At step 202, a buyer and/or seller submits an attribute certificate to the E-marketplace. This may involve completion of a form provided by the E-marketplace that solicits specific transaction information regarding a particular proposed sale, purchase, or desires for a purchase.

At step 204, the E-marketplace confirms the validity of any and all attributes submitted by the buyers and/or sellers. If the E-marketplace determines that any of the attributes which were submitted are invalid, then they may be omitted and not provided in response to inquiries about a particular transaction, and/or the attribute certificate will be completely excluded from the E-marketplace. If, however, the attributes are valid, then they will be provided to all users of the E-marketplace.

At step 206, a buyer accesses the E-marketplace via the network connection and identifies a potential business transaction of interest and requests more detailed transaction information regarding same. This can comprise the simple action of clicking on an icon identifying the transaction, or any other known means of selecting information from an E-marketplace.

At step 208, the E-marketplace provides confirmed transaction information for the potential business transaction to the buyer. At step 209, a determination is made as to whether or not the transaction matches the needs of the buyer. If it does not, the process reverts back to block 206 and the buyer identifies another potential transaction.

If the needs of the buyer are met, however, at step 210, based on this information, the buyer can decide to negotiate with the seller. This can take place by e-mail, submission of forms for viewing by the seller, or any other means of communicating with the seller. In the preferred embodiment, no identity information is provided to the seller by the buyer; instead, the seller receives the information submitted by the buyer in the attribute certificate, all of which pertains specifically to the transaction in question. As noted above, this information may include desired quantity information, financial and credit information, and the like.

At step 214, a determination is made as to whether or not the negotiating parties have a "match" respecting the transaction. If, for example, all of the parameters desired by seller match the characteristics supplied by the buyer, and if the characteristics provided by the seller match those requested by the buyer, then a match is determined to have occurred and the process proceeds to step 216 where the parties negotiate the final contract terms, and then at step 218 the seller and buyer are identified to each other for the final transaction. If, on the other hand, at step 214, a match is not identified, then the potential transaction is terminated and presumably buyer and seller move on to look for other potential negotiating partners.

Using the present invention, all of the necessary transaction information for a particular transaction is summarized and available to all interested parties without identifying the parties. In this manner, a large corporation can participate in a transaction based on the transaction itself and other participants will have no idea of the size of the company. Likewise, a smaller unknown company can compete with others based on the transaction they can complete instead of their reputation (or lack thereof).

The buyer and seller can provide any transaction information that is important in enabling a deal to be transacted, but without identifying who the parties are. The attribute certificate is issued by the marketplace and is valid only for a particular transaction and then is terminated.

The following example illustrates a use of the present invention in a B2B environment.

Assume that a Fortune 500 company called XYZ Corporation has a need to be able to purchase 10,000 units of widget A each month, for a period of two years. As a Fortune 500 company, XYZ Corporation is aware that smaller companies may charge higher than average prices simply in view of the fact that they are selling to a large corporation with a "deep pocket". Accordingly, they wish to remain anonymous in the transaction.

Suppose also that a smaller corporation, ABC, Inc. is able to produce a volume needed by XYZ Corporation, but does not have an established name in the field, i.e., they are a young startup company that is trying to establish market identity but has not yet done so. Their fear is that a player in the marketplace will not consider purchasing from them because of their lack of market recognition. Accordingly, they wish to anonymously participate in the market, identifying the positive attributes they possess that will make them a desirable company with which to conduct business.

Use of attributes certificates in accordance with the present invention serves this purpose well. XYZ Corporation can present to the E-marketplace an attribute certificate which identifies them as having annual sales of three billion dollars, having a credit line of two million dollars, and having a history of payment for all transactions over the last five years within thirty days from date of delivery.

Likewise, ABC, Inc. can identify in its attribute certificate that it has only positive ratings for all of its transactions over past two years, that it is capable of filling orders of up to 20,000 units of widget A per month, and that it requires payment within thirty days of delivery.

In accordance with the present invention, each of the parameters identified in the attribute certificate are verified by the E-marketplace, so that the buyers and sellers do not have to rely upon otherwise unverified statements made by each other. The parties can quickly see that their required parameters for the transaction have been met, and the deal can proceed to completion.

As noted above, in the preferred embodiment, once the final contract terms have been negotiated between the parties, the seller and buyer are identified to each other for the final transaction. However, it is understood and contemplated that there may be situations arising in which the actual identity of a party may never be identified. For example, it is not uncommon for a purchaser of artwork to remain anonymous and that the buyer simply puts forth a bond as provability to pay, and then arranges for payment. In addition, situations may arise when one government may desire to purchase goods without revealing to anyone the final purchaser, for fear that this would compromise national security or cause political fallout. In addition, there may situations where businesses may wish to keep a competitive edge by not divulging to a seller who is buying the supplies, for example, a situation where a manufacturer purchases goods from a competitor in order to meet a particular demand, but does not wish the competitor to know that the purchaser of the goods is a competitor. The present invention and the following claims cover this situation as well as those described above.

The present invention can be embodied in either hardware or software. In a preferred embodiment, the present invention is embodied in software code residing on the E-marketplace server(s) to carry out the described steps and functions.

Figure 3:
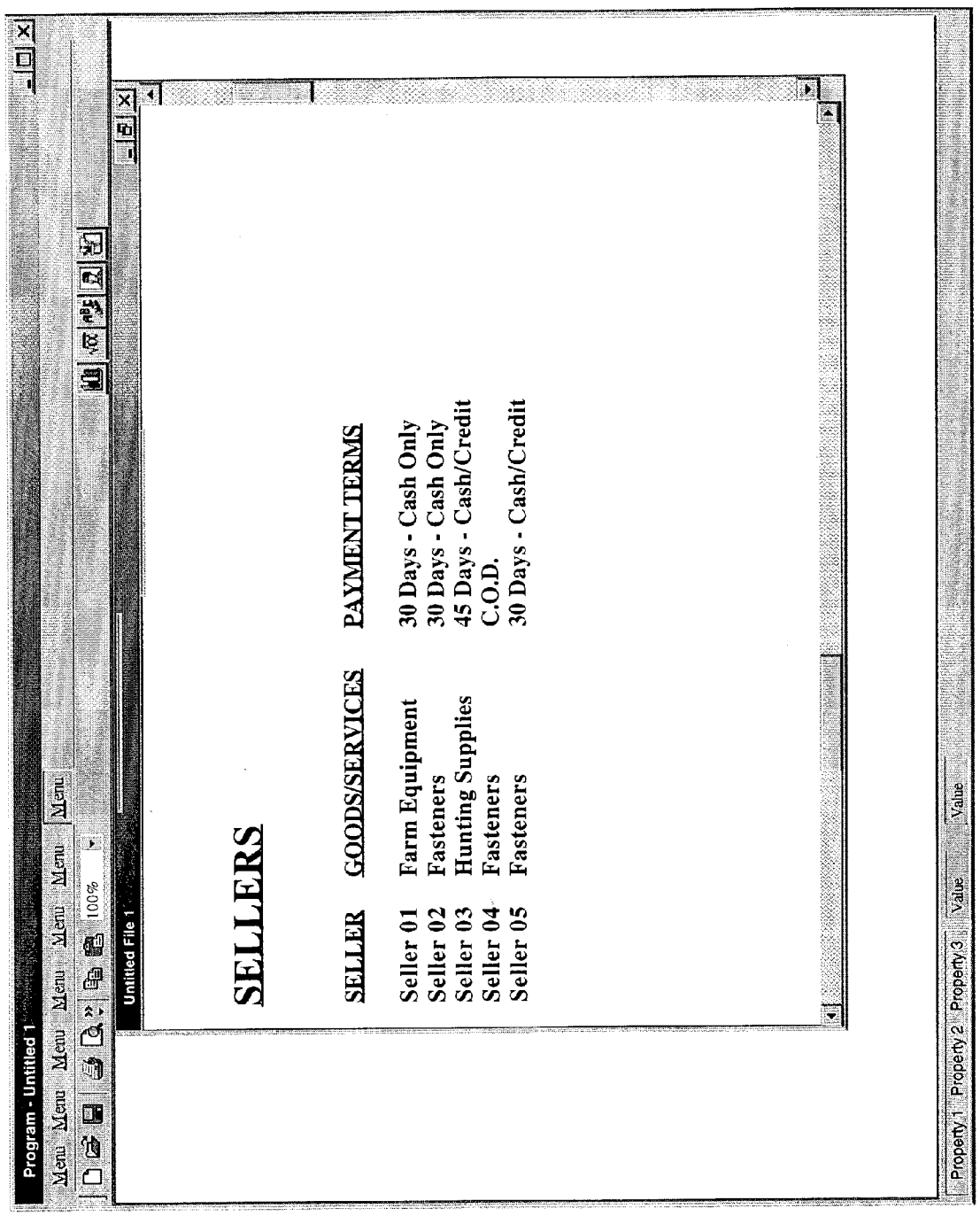
FIG. 3 is an example of a "screen capture" from a graphical user interface illustrating how the present invention might be implemented for use.

FIG. 3 is an example of a "screen capture" from a graphical user interface (GUI), illustrating how the present invention might be implemented for use. In the example of FIG. 3, a user of the E-Marketplace-(a buyer in this example) would be shown a window listing sellers who have listed good and/or services for sale on the E-Marketplace. In this example, only 5 sellers are listed; it is understood that in most circumstances, there would be hundreds, thousands, or more sellers listed, and well-known selection techniques could be used to limit the display to show only sellers that meet certain criteria established by the buyer.

In the example of FIG. 3, the sellers are listed generically (e.g., "Seller 01; Seller 02, etc) to protect their identity, but certain criteria of the sellers, as gleaned from their attribute certificate" are displayed for the buyer to peruse. In this example, two attributes, "GOODS/SERVICES" and "PAYMENT TERMS" are shown. It is understood that any attributes can be displayed, dependent on the desires of the Buyer, Seller, and/or E-Marketplace. Since the information displayed in the window of FIG. 3 has been verified by the E-Marketplace, the Buyer is assured of the accuracy, and can select from among the Sellers listed, without ever knowing anything more about the entity but with the assurance (due to the verification by the E-Marketplace) that the Seller can follow through with the offers presented. Obviously FIG. 3 is only one example of one aspect of the present invention. Similar pages can be displayed showing information regarding Buyers, for example, and any desired attributes can be displayed, beyond those illustrated, The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of some type, such as in the permanent storage of a workstation or server maintained by the E-Marketplace. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

Although the present invention has been described with respect to a specific preferred embodiment thereof, various changes and modifications may be suggested to one skilled in the art and it is intended that the present invention encompass such changes and modifications as fall within the scope of the appended claims.

We claim:

1. A method of conducting an electronic commerce transaction, comprising the steps of:
   creating an attribute certificate for each prospective participant to said transaction, wherein each of said attribute certificates contains only transaction information, said transaction information comprising one or more transaction elements;
   submitting each of said attribute certificates to a third party;
   validating each of said attribute certificates by said third party, said validation step comprising at least the steps of:
      checking the accuracy of each transaction element; and
      deleting from said attribute certificate those transaction elements that are inaccurate; and
   making all validated attribute certificates available to each prospective participant to said transaction.

2. A method as set forth in claim 1, wherein said third party comprises an E-marketplace.

3. A method as set forth in claim 1, further comprising the steps of:
   reading each validated attribute certificate; and
   identifying potential partners to said transaction based on said transaction information contained in each read validated attribute certificate.

4. A system for conducting an electronic commerce transaction, comprising:
   means for creating an attribute certificate for each prospective participant to said transactions, wherein each of said attribute certificates contains only transaction information, said transaction information comprising one or more transaction elements;
   means for submitting each of said attribute certificates to a third party;
   means for validating each of said attribute certificates by said third party, said validation step comprising at least:
      means for checking the accuracy of each transaction element; and
      means for deleting from said attribute certificate those transaction elements that are inaccurate; and
      means for making all validated attribute certificates available to each prospective participant to said transaction.

5. A system as set forth in claim 4, wherein said third party comprises an E-marketplace.

6. A system as set forth in claim 4, further comprising:
   means for reading each validated attribute certificate; and
   means for identifying potential partners to said transaction based on said transaction information contained in each read validated attribute certificate.

7. A system as set forth in claim 6, further comprising:
   means for selecting at least one business partner from said identified potential partners; and
   means for generating a solicitation to said third party requesting that said identified potential partner(s) be advised of said selection.

8. A computer program product for conducting an electronic commerce transaction recorded on computer-readable storage medium, comprising:
   computer-readable means for creating an attribute certificate for each prospective participant to said transaction, wherein each of said attribute certificates contains only transaction information, said transaction information comprising one or more transaction elements;
   computer-readable means for submitting each of said attribute certificates to a third party;
   computer-readable means for validating each of said attribute certificates by said third party, said validation step comprising:
      computer-readable means for checking the accuracy of each transaction element; and
      computer-readable means for deleting from said attribute certificate those transaction elements that are inaccurate; and
      computer-readable means for making all validated attribute certificates available to each prospective participant to said transaction.

9. A computer program product as set forth in claim 8, wherein said third party comprises an E-marketplace.

10. A computer program product as set forth in claim 8, further comprising:
   computer-readable means for reading each validated attribute certificate; and
   computer-readable means for identifying potential partners to said transaction based on said transaction information contained in each read validated attribute certificate.

11. A computer program product as set forth in claim 10, further comprising:
   computer-readable means for selecting at least one business partner from said identified potential partners; and
   computer-readable means for generating a solicitation to said third party requesting that said identified potential partner(s) be advised of said selection.

* * * * *

UNITED STATES PATENT AND TRADEMARK OFFICE
CERTIFICATE OF CORRECTION

| | | |
|---|---|---|
| PATENT NO. | : 7,065,509 B2 | Page 1 of 1 |
| APPLICATION NO. | : 10/434883 | |
| DATED | : June 20, 2006 | |
| INVENTOR(S) | : Arnold et al. | |

It is certified that error appears in the above-identified patent and that said Letters Patent is hereby corrected as shown below:

Column 10, line 8, claim 12 should appear as follows:

--12. A method as set forth in claim 3, further comprising the steps of:
selecting at least one business partner from said identified potential partners; and generating a solicitation to said third party requesting that said identified potential partner(s) be advised of said selection.--

Signed and Sealed this

Twenty-first Day of November, 2006

JON W. DUDAS
*Director of the United States Patent and Trademark Office*